United States Patent [19]

Rohde

[11] 4,353,716

[45] Oct. 12, 1982

[54] PROCESS AND APPARATUS FOR THE REGENERATION OF AN ADSORBER

[75] Inventor: Wilhelm Rohde, Munich, Fed. Rep. of Germany

[73] Assignee: Linde Aktiengesellschaft, Wiesbaden, Fed. Rep. of Germany

[21] Appl. No.: 292,116

[22] Filed: Aug. 12, 1981

[30] Foreign Application Priority Data

Aug. 12, 1980 [DE] Fed. Rep. of Germany ....... 3030474

[51] Int. Cl.³ .............................................. B01D 53/04
[52] U.S. Cl. ........................................... 55/59; 55/75; 55/196; 55/389; 252/411 R
[58] Field of Search .................... 55/31, 33, 59, 62, 74, 55/75, 179, 180, 196, 387, 389; 252/411 R

[56] References Cited

U.S. PATENT DOCUMENTS

| | | | |
|---|---|---|---|
| 1,577,200 | 3/1926 | Voress et al. | 55/387 |
| 2,083,732 | 6/1937 | Moore et al. | 55/33 X |
| 2,359,660 | 10/1944 | Martin et al. | 55/33 |
| 2,435,781 | 2/1948 | Heydorn | 55/387 X |
| 2,818,133 | 12/1957 | Rosenthal | 55/59 |
| 3,123,453 | 3/1964 | Loomer et al. | 55/33 |
| 3,955,946 | 5/1976 | Fuhring et al. | 55/179 |
| 4,030,896 | 6/1977 | Wimber et al. | 55/62 X |

Primary Examiner—Robert H. Spitzer
Attorney, Agent, or Firm—Millen & White

[57] ABSTRACT

A process and apparatus for regenerating an adsorber through which alternatingly flows a raw gas and a regenerating gas. Adsorbent material is arranged within the adsorber and the ratio of the amount of raw gas to regenerating gas conducted over the adsorbent material adjacent the walls of the adsorber per unit area of adsorbent material is greater than the ratio of the amount of raw gas to regenerating gas conducted per unit area over the remaining adsorbent material. The amount of raw gas and regenerating gas conducted over the adsorbent material is adjusted and controlled by providing a bulkhead within the adsorber to separate the adsorbent material adjacent the adsorber wall from the remaining adsorbent material. Secondary feeding or discharge means is associated with the bulkhead area for regulating the flow of regenerating gas therethrough.

12 Claims, 3 Drawing Figures

PROCESS AND APPARATUS FOR THE REGENERATION OF AN ADSORBER

BACKGROUND OF THE INVENTION

This invention is directed to an apparatus and process for the regeneration of an adsorber through which alternatingly flows raw gas and regenerating gas. An adsorbent is arranged in a container and the regenerating gas is conducted over the loaded adsorbent in an adsorber for conducting the process.

Adsorbers serve for the selective removal of one or several components from a raw gas to be purified. For this purpose, a raw gas is conducted over an adsorbent in which the components are adsorbed. The resultant gaseous mixture, freed of these components, is then discharged from the adsorber. After a specific time period, depending on the ambient conditions such as pressure, temperature, type and concentration of the impurities, as well as of the adsorbent, the adsorbent becomes loaded and is no longer capable of adsorbing additional gas. At this point, the feed of raw gas to the adsorber is cut off, and a regenerating gas is conducted over the adsorbent. The regenerating gas adsorbs the adsorbed components and carries them out of the adsorber. In order to ensure continuous operation, adsorbers are in most cases operated in pairs, wherein one of the adsorbers is always loaded while the other is being regenerated. As an example of such a process, a method for the adsorptive removal of moisture and carbon dioxide from air will be described as representative of many of the technical applications possible.

In many cases, the amount of regenerating gas available is limited. Thus, in order to obtain a useful regeneration of the adsorbent, the regenerating gas is heated. The temperature level of the regenerating gas depends, in addition to other factors, on the specific types of components to be removed from the raw gas. However, it has been found that, as a result of the relatively large heat capacity of the adsorbent container carrying the adsorbent, a temperature gradient results throughout the cross section of the adsorbent. Thus, the temperature of regenerating gas in the zone of the container wall is almost at ambient temperature levels, and reaches the highest temperature only near the center of the container. As a result, only a minor regeneration, or at least an inadequate regeneration, of the adsorbent occurs in the areas near the container wall.

The prior art has proposed elimination of the above-described problems by arranging a thin walled internal container of low heat capacity within the interior of the adsorbent container. The outer adsorbent container is built substantially pressure-proof, depending upon the occuring gas pressures and the static loads thereon and therefore, represents a large heat capacity.

The internal container is spaced from the walls of the outer container and is tightly connected to the outer container on one side. There are openings on the other side of the inner container establishing communication between the interior of the inner container housing adsorbent and the space between the outside internal container and the inside wall of the outer adsorbent container. This arrangement ensures that essentially the same pressure will prevail in the interior of the inner container and in the space between the inner container and the outer adsorbent container. Thus, the inner container is essentially pressureless because of the equalizing pressures on the outside and in the interior thereof. As a result, while the pressure in the container continues to act on the thick-walled, rugged outer container, the adsorbent is surrounded by the thin-walled internal container having a lower heat capacity. An adsorber of this type is shown in U.S. Pat. No. 2,083,732.

However, it has been found that such adsorbers exhibit a number of serious disadvantages. One major disadvantage is the great expense incurred in tightly connecting and sealing the internal container to the outer container. Even the smallest leak results in part of the gas to be purified flowing through the pressure equalizing openings and the space between the inner and outer containers. Thus, the portion of the gas flowing through said space will not be purified in the adsorbent in the interior container, because there is no adsorbent material in the space between the inner and outer diameters. Another disadvantage is that thermal stresses resulting from temperature differences between the high temperature regenerating gas and the low operating temperature, or a suddenly occurring pressure fluctuation on account of faulty switching operations when the automatic switching system fails, can lead to damage to the internal container.

SUMMARY OF THE INVENTION

Therefore, it is an object of the present invention to provide a process for the regeneration of an adsorber which ensures an optimum regeneration of the entire adsorbent, and which simultaneously reduces the cost of manufacturing the apparatus, and increases operating safety.

Upon further study of the specification and appended claims, further objects and advantages of this invention will become apparent to those skilled in the art.

The object of the invention is attained by providing that, in the adsorbent, the ratio of the flow of regenerating gas to the flow of raw gas is adjusted in the zone near the container wall to be higher than in the remainder of the adsorbent.

As a result of the arrangement of the invention, a marginal outer zone is created wherein the above-described ratio is higher than in the remaining adsorber. The greater the amount of regenerating gas relative to the amount of raw gas, the lower the regenerating gas temperature required. Even if the regenerating gas is cooled substantially in the region of the container wall, the adsorbent material will nonetheless be regenerated to an adequate extent in that location as a result of the increased regenerating gas flow relative to the flow of raw gas.

The process of the invention allows elimination of the above-described expensive and trouble prone internal container. At the same time, the process ensures a substantially complete regeneration of the adsorbent in the adsorbent container.

In one embodiment of the process of the invention, the amount of raw gas conducted over the adsorbent located in the zone of the container wall is reduced.

According to a second embodiment of the invention, a portion of the regenerating gas is fed separately from the remaining portion of the regenerating gas, to the adsorbent present in the zone of the container wall, or the portion present in the adsorbent near the container wall is removed separately from the remaining portion of the regenerating gas from the adsorbent.

In a preferred embodiment of the invention, the quantitative ratio of regenerating gas to the raw gas in the zone near the container wall is a ratio equal to at least two (2), preferably between 2 and 6, and more preferably 2 to 3. The term "amount of raw gas" is understood in this connection to mean the effective quantity of raw gas. "Effective quantity" means the volume of the raw gas under the temperature and pressure prevailing in the adsorbent container.

By "the zone near the container wall" is meant the zone where the temperature in the adsorbent drops from the temperature prevailing in the interior of the container (which is approximately constant over the inner cross section of the adsorbent) to the temperature of the container wall, which is at about ambient temperature. The range of this zone is from the container wall up to 15 cm, preferably up to 8 cm into the interior of the container.

The advantages of this invention are especially pronounced when the regenerating gas has a temperature of 80° to 250° C., preferably 150° C.

An adsorber for conducting the process of the invention comprises an adsorbent material arranged in a container, and means for the feeding and discharging of raw gas and regenerating gas into and out of the container. The apparatus includes a bulkhead located in the zone of the container wall for separating the adsorbent arranged in the zone adjacent to the container wall from the remaining adsorbent in the container. The bulkhead is open on one side, in the direction of flow of the gases, and is at least almost completely closed on the other side. There is no need to connect and seal the bulkhead tightly to the container wall because the space between the bulkhead and the wall is filled with adsorbent material. Therefore, if a small amount of raw gas enters said space, the raw gas will be purified by the adsorbent. Additionally, secondary feeding or discharge means for regenerating gas is provided in the bulkhead zone.

The apparatus of the invention is used to achieve a lesser flow of the amount of raw gas through the adsorbent located within the bulkhead, than the flow amount of raw gas flowing through the remaining adsorbent. However, it is not required that the bulkhead be completely leakproof on one side because the bulkheaded space is filled with adsorbent material. Thus, gases flowing therethrough are also adsorptively purified in this region.

The only requirement is that steps must be taken to ensure that less raw gas flows, per unit area of the adsorbent, through the bulkhead space than through the remaining adsorber, so that the ratio of flow of regenerating gas to raw gas is increased in the zone near the container wall. However, this feature can be attained without requiring additional expenditure, for example, by spot-welding the bulkhead to the container wall. The bulkhead can be made very thin, preferably 0.5 to 4 mm, and more preferably 2 mm, because the pressure on either side is essentially the same. Since the bulkhead can be made very thin, it has only a small mass. Therefore, the bulkhead has a very low thermal capacity.

During regeneration, a portion of the regenerating gas is fed through the customary feeding devices; the remaining portion is introduced through the secondary feeding device directly into the bulkhead space and/or is discharged therefrom. Consequently, the same amount of regenerating gas can be adjusted inside and outside the bulkhead for a defined specific area of the adsorbent. However, since according to the invention, a substantially lesser amount of raw gas is passed through the interior of the bulkhead, the ratio of regenerating gas to raw gas is, at that location, higher than in the central portion of the adsorber. Thus, the quality of the regeneration is not affected if the regenerating gas becomes cooled on the container wall. On the other hand, the regenerating gas flowing on the other side of the bulkhead, away from the container wall, is only slightly cooled off on account of the low heat capacity of the wall of the bulkhead.

In a preferred embodiment of the apparatus of the present invention, a bulkhead wall is connected with its upper rim above the level of the adsorbent within the container, and with its lower rim having a grate on which the adsorbent rests. A secondary feeding means for the regenerating gas terminates in this case above the upper level of the adsorbent, but below the mounting line for the bulkhead on the outer wall.

In another preferred embodiment of the invention, the bulkhead wall is connected to the container wall below the level of the adsorbent and extends up to the upper edge of the adsorbent. In this arrangement, a secondary discharge means for the regenerating gas terminates below the lower edge of the adsorbent, but above the mounting line for the bulkhead.

BRIEF DESCRIPTION OF THE DRAWINGS

The invention will be described in greater detail with reference to the attached drawings in which.

DETAILED DISCUSSION OF THE INVENTION

Figure 1:
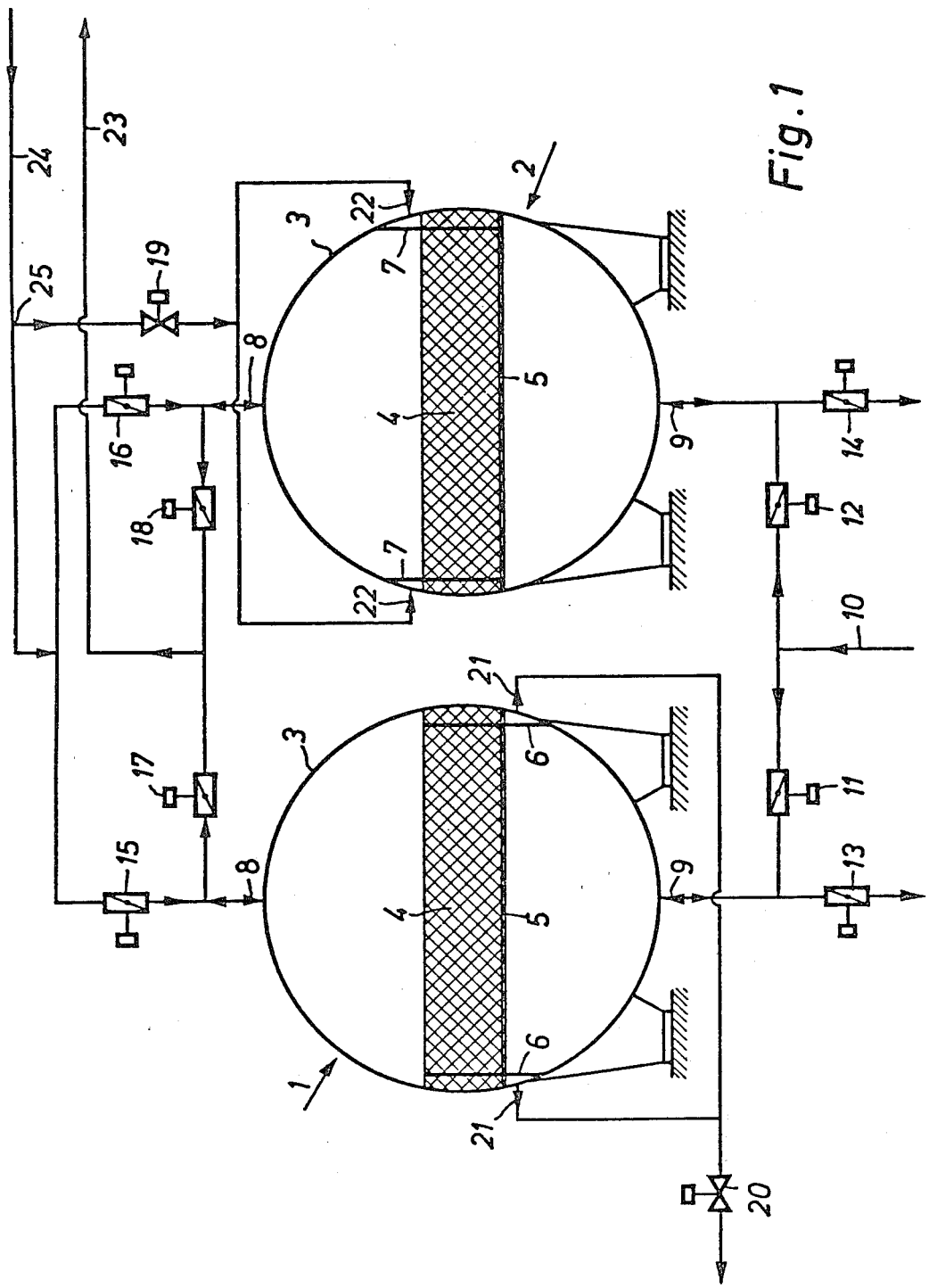
FIG. 1 is a schematic diagram of the invention showing a switching arrangement having two different adsorbers according to separate embodiments of the invention.

The arrangement of the invention schematically illustrated in FIG. 1 shows an apparatus for the adsorptive purification of air as the raw gas, wherein moisture and carbon dioxide especially are removed from the air.

Reference numerals 1 and 2 designate a pair of periodically reversible adsorbers which alternatingly have air and regenerating gas flowing therethrough. Each of the adsorbers 1 and 2 contains an adsorbent 4, for example, a molecular sieve charge, arranged in a container 3. The adsorbent rests on a gas-permeable grate 5. According to the invention, one partition is respectively provided in the zone of the container wall made up by a respective bulkhead 6 or 7. The partition separates the adsorbent arranged in the region of the container wall from the remainder of the adsorbent.

Two different examples of the present invention are illustrated with the reference to adsorbers 1 and 2. The bulkhead 6 of adsorber 1 is connected with its lower edge underneath the grate 5 within the container 1, and extends with its upper edge up into the level of the upper edge of the adsorbent packing. The bulkhead 7 of adsorber 2 is connected with its upper edge above the level of adsorbent 4 to the wall of the container 3, and with its lower edge to the grate 5. It is not necessary for the walls 6 and 7 to respectively contact the wall of the containers 3. Instead, it is sufficient that the walls 6 and 7 constrict the flow cross section to an extent such that merely a portion of the air flowing within the main body of the adsorber passes through the bulkhead, i.e., the amount of flow per unit area is greater in the central portion of the adsorber than in the bulkhead area.

The adsorbers 1 and 2 include feeding and discharging means 8 and 9 for the regenerating gas and air. An additional discharging unit 21 for the regenerating gas is provided underneath the grate 5 in the bulkhead of container 1. An additional feeding unit 22 for regenerating gas is also provided above the upper edge of the adsorbent 4 of container 2. In operation, a plant will normally use only one type of the adsorbers shown, i.e., either only adsorbers of the type of adsorber 1, or only of adsorbers of the type of adsorber 2. The arrangement shown in FIG. 1 merely serves to simultaneously illustrate the two types of adsorbers employed.

The mode of operation of the above-described arrangement is as follows:

The air to be purified is fed through line 10 and, depending on the position of the switching valves 11 and 12, is conducted either through adsorber 1 or adsorber 2. For example, when adsorber 1 is in operation, the switching valve 11 is opened and the switching valve 12 is closed. In this operating condition, the switching valves 13, 15, 18, and 20 are closed and the switching valves 14, 16, 17 and 19 are opened.

The air passes through feeding/discharge means 9 into adsorber 1, with the largest portion of the air passing through the adsorbent 4 located between the two bulkheads 6. A small amount of air enters into the bulkhead section through leakage points and/or through a greatly constricted cross sectional area of flow at the junction between the bulkheads 6 and the container wall, and flows through the adsorbent disposed within the bulkhead section. This portion of the air leaves the adsorber 1, together with the main flow of the air, through the feeding/discharge means 8 and is removed through line 23. As a result of the narrowed inlet flow cross section, a substantially smaller amount of air per unit area of the adsorbent flows into the bulkhead section than through the main section of the adsorber containing adsorbent therein. The adsorbent located in the region adjacent to the container wall within the bulkhead section is therefore substantially less loaded than the remainder of the adsorbent.

A heated regenerating gas, i.e., impure nitrogen from an air fractionation plant, is fed through conduit 24 through the switching valve 16 and the feeding/discharge means 8 to the adsorber 2. The adsorber 2 is at this time loaded as a result of the previously described switching cycle. At junction 25, a portion of the regenerating gas is branched off and introduced directly into the bulkhead sections of adsorber 2 through the secondary feed means 22. The two partial streams of regenerating gas are adjusted so that the same amount of regenerating gas per unit area of adsorbent is available within, and outside the bulkhead section in the remaining area of the adsorber 2. As a result of less air having been passed through the bulkhead section, the ratio of regenerating gas to raw gas, i.e., air in the bulkhead region is larger than in the remainder of the adsorber. Thus, the cooling of the regenerating gas within the bulkhead section on the container wall does not affect or impair adequate regeneration due to the increased quantitative ratio of flow within the bulkhead section.

In addition, the bulkhead 7 will be cooled off only to a very small extent, because it is only at a very small area connected to the container wall. Furthermore the bulkhead has a very low heat capacity as compared to the container wall, so that the regenerating gas flowing between the walls 7 is minimally cooled. The adsorbent is therefore regenerated substantially uniformly throughout the entire adsorption vessel.

In the subsequent switching cycle which is described hereinafter, the previously opened switching valves are closed, and the previously closed valves are then opened. The air now flows into the regenerated adsorber 2 wherein, analogously to the preceding description, because of the leakage points and/or a greatly constricted flow cross section between the bulkhead 7 and the container wall, a relatively small amount of air per unit area flows over the adsorbent within the bulkhead section. The entire amount of regenerating gas is fed to the adsorber 1 through the feeding/discharge means 8. A portion of the regenerating gas leaves the adsorber 1 through the feeding/discharge means 9; and the remaining portion leaves the adsorber 1 through the additional discharge means 21. The two partial streams are in turn adjusted so that inside and outside of the bulkhead section the same amount of regenerating gas per unit area of the adsorbent flows over the adsorbent 4. Because in the preceding switching cycle less air flowed through the bulkhead section than through the outside thereof, the ratio of regenerating gas to raw gas is thus greater in this instance.

To further clarify the operation of the invention, the following example sets forth various operating parameters under which the process of the invention is performed.

EXAMPLE

In an adsorber according to the invention, 100,000 Nm$^3$/h (Nm$^3$/h refers to m$^3$/h at Normal operating conditions, i.e., 1 atm pressure absolute at 0° C.) of air at 6 bar and 8° C. was dried and purified from other impurities, essentially carbon dioxide. To purify the described quantity of air, an amount of a molecular sieve of about 21 m$^3$ was required. A packing height of 0.7 was used resulting in a cross-sectional surface area of 30 m$^2$ for the molecular sieve bed. The molecular sieve bed was accommodated horizontally in a container having a cross-sectional area of, for example, 3.5 m by 8.6 m, i.e., 30.1 m$^2$. An additional packing having a width of 50 mm was provided on all sides around the main area. Thus, the total surface area of the molecular sieve bed was 3.6 m times 8.7 m, i.e., 31.32 m$^2$. The additional packing represents an enlargement of the main area, and thus also of the amount of molecular sieve of about 4%. A vertically extending bulkhead was mounted in the thus-designed adsorber in the manner described hereinabove at a spacing of 50 mm from the outside wall. The bulkhead was connected to the outer wall at either its upper or lower edge in a simple manner, e.g., by spot welding, whereby a greatly restricted flow cross section was produced at said connection point. Absolute tightness or sealing was unnecessary.

In order to regenerate the adsorber, an amount of regenerating gas amounting to about 20% of the air which was passed through the adsorber, i.e. 20,000 Nm$^3$/h, heated to about 150° C., was required. As a result of the cross-sectional constriction at the bulkhead section, substantially less air, i.e., for example only 1% of the air, flowed through the charge of adsorbent arranged within the bulkhead section, said charge in the bulkhead section amounting to about 4% of the total charge. In the described example, this amount of flow through the bulkhead section was 1,000 Nm$^3$/h, i.e., at 6 bar and 8° C., flowing through about 170 effective cubic meters of adsorbent. On the other hand, by means of the additional feeding or discharge means for regenerating gas at the inlet or outlet of the bulkhead section, it was ensured that within the bulkhead section the same hot regenerating gas quantity flowed per unit area as in the total packing. Thus, at a flow rate of 4% of 20,000 $Nm^3/h$, an amount of 800 $Nm^3/h$ flowed therethrough. As a result, a ratio of regenerating gas quantity to raw gas quantity of 4.7:1 prevailed in the marginal zone within the bulkhead adjacent the container wall. The ratio of 2:1 which was indicated above as the minimum for ensuring adequate regeneration with an unheated regenerating gas, is thus far exceeded.

In the above-described process, the regenerating gas was in the heated state. Thus, even if the entire heat contained in the regenerating gas was lost by heating up of the outer container, the adsorbent arranged in the marginal zone was still adequately regenerated, because in this zone the ratio of the flow of regenerating gas to the flow of raw gas is adjusted to be higher than in the remainder of the adsorbent.

Although the above-described example is discussed with reference to specified values, these values are for illustration purposes only and can fall within a broader range. More specifically, an amount of a molecular sieve of 0.1 $m^3$ to 250 $m^3$ can be used having a packing height of 25 cm to 250 cm to result in a cross-sectional area of 0.05 $m^2$ to 100 $m^2$. The additional packing adjacent the container wall can have a width of 20 mm to 150 mm. The additional packing thus represents an enlargement of the main area of 0.5% to 10%.

In order to regenerate the adsorber, 50 $Nm^3/h$ to 100,000 $Nm^3/h$ heated to 80° to 250° C. is required. As a result of the constricted flow at the bulkhead section only 0.01 to 8% flows through the adsorbent charge therein. Thus, the flow of regenerating gas through the bulkhead section is 0.25 $m^3$ to 10000 $m^3$.

Figure 2:
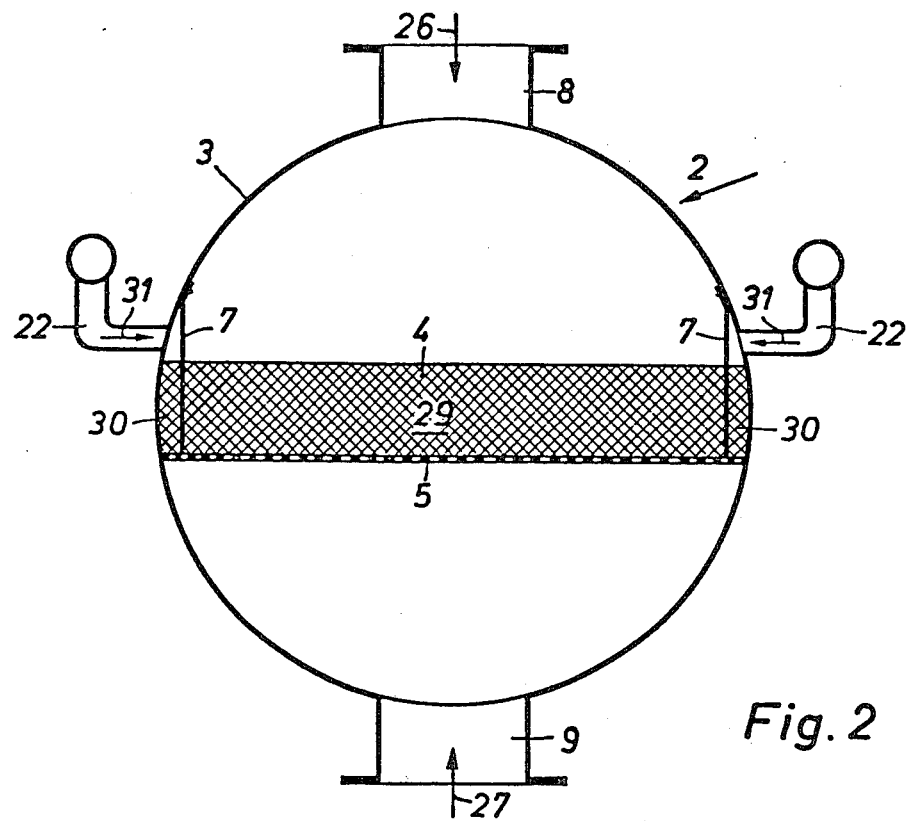
FIG. 2 is a cross-sectional schematic diagram of an adsorber according to one embodiment of the invention.
Figure 3:
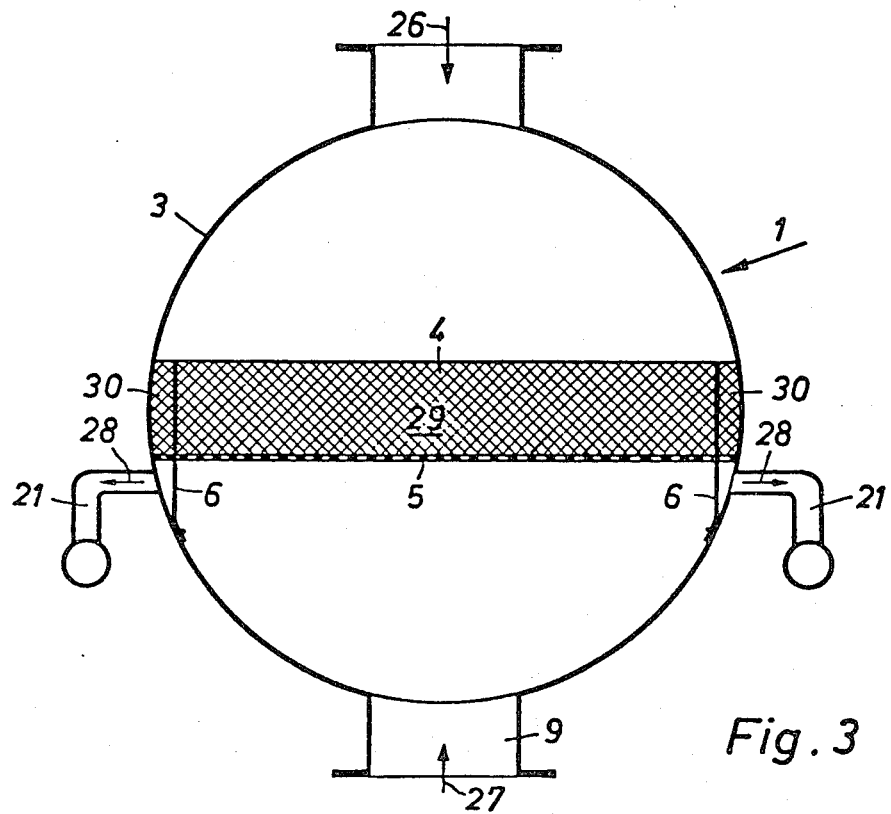
FIG. 3 is a cross-sectional schematic diagram of another embodiment of another adsorber according to the invention.

FIGS. 2 and 3 are sectional views of adsorbers according to this invention. The adsorber of FIG. 2 corresponds to an adsorber of the type of adsorber 2 of FIG. 1. The adsorber of FIG. 3 is an adsorber of the type of adsorber 1 according to FIG. 1. Therefore, identical reference numerals are used for analogous components. In successive switching cycles, air 27 and regenerating gas 26, 22 and 21 are fed alternatingly to the adsorbers 1 and 2.

In the adsorber of FIG. 2, as a result of the constricted flow cross section at the mounting line of the bulkhead 7 with the container 3, relatively less air flows through the adsorbent 30 arranged within the bulkhead section than through the adsorbent 29 located between the two bulkheads 7. The entire amount of adsorbent is designated by reference numeral 4. In the regeneration of adsorber 2, regenerating gas 26 is fed through the feeding/discharge means 8. Additional regenerating gas 31 is introduced through feeding means 22 so that the regenerating gas fed through the feeding/discharge means 8 flows over the adsorbent 29, and the regenerating gas introduced through the feeding means 22 flows over the adsorbent 30. The regenerating gas streams are adjusted so that in both partial zones, the same amount of regenerating gas flows per unit area of the adsorbent.

In the adsorber of FIG. 3, relatively less air flows through the adsorbent 30 arranged within the bulkhead section than through the adsorbent 29 resting between the two bulkheads 6 as a result of the constricted flow cross section formed at the connecting joint between the bulkhead 6 and the container 3. During regeneration of the adsorber 1, regenerating gas is fed exclusively through the feeding/discharge opening 8. A portion of the regenerating gas flows over the adsorbent 29 and leaves the adsorber through the feeding/discharge means 9. The remaining portion 28 of the regenerating gas flows over the adsorbent 30 and leaves the adsorber 1 through the additional discharge means 21. The two partial streams are adjusted with respect to each other in such a way that in both partial zones 29 and 30 of the adsorbent packing 4, an equal regenerating gas quantity flows per unit area of the adsorbent.

The described embodiments of the present invention represent especially advantageous possibilities for conducting the process of this invention, but are not the sole possibilities. It is possible for example, to increase the ratio of regenerating gas to raw gas in the marginal zones within the bulkhead adjacent the container wall by means of gas baffles which either increase the feed of regenerating gas in this zone, and/or limit the feed of raw gas to this region, or by means of nozzles through which additional regenerating gas is introduced into the "marginal" zone.

The embodiment with the attached bulkheads described hereinabove provides the advantage that it is simple and economical in construction and can be easily manufactured. Instead of the embodiment shown hereinbefore with a horizontally arranged cylindrical adsorbent container, it is also possible to have a cylindrical container with vertical axis. In this case the bulkhead has the cross-sectional shape of a ring limiting an annular marginal zone near the container wall. The bulkhead is open on one side, in the direction of flow of the gases (i.e. the direction of the longitudinal axis of the cylindrical container) and is at least almost completely closed on the other side.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for regenerating an adsorber of the type wherein a raw gas and a regenerating gas alternatingly flow therethrough, the adsorber including an adsorbent material supported within a container having a wall extending around said container, the improvement comprising: conducting the regenerating gas over the loaded adsorbent and simultaneously adjusting the ratio of the rate of flow of the regenerating gas relative to the rate of flow of a previously conducted raw gas flow to be higher over the adsorbent material located adjacent said container wall than the defined ratio of the rate of flow over the remaining adsorbent material in the container.

2. A process according to claim 1, wherein said adjusting step comprises conducting a reduced amount of raw gas per unit area of adsorbent over the adsorbent material adjacent the container wall relative to the amount of raw gas per unit area of adsorbent conducted over the remaining adsorbent during the adsorption phase of the adsorber.

3. A process according to claims 1 or 2, wherein said adjusting step further comprises feeding a portion of the regenerating gas to the adsorbent located adjacent to said container wall separately to the feeding of the remaining portion of the regenerating gas to the remaining adsorbent.

4. A process according to claims 1 or 2, wherein said adjusting step further comprises discharging a portion of the regenerating gas from the adsorbent located adjacent said container wall separately from the discharging of the remaining portion of the regenerating gas from the remaining adsorbent.

5. A process according to claims 1 or 2, wherein said adjusting step comprises adjusting said ratio of regenerating gas to the effective amount of raw gas conducted over the adsorbent material adjacent said container wall to equal at least 2.

6. A process according to claim 5 wherein, said ratio is adjusted to equal 2 to 6.

7. A process according to claim 6, wherein, said ratio is adjusted to equal 2 to 3.

8. In an adsorber for conducting a process wherein a raw gas and a regenerating gas alternatingly flow therethrough, the adsorber including an adsorbent arranged in a container having a wall extending around said container, and having primary feeding means and primary discharge means connected thereto for feeding and discharging raw gas and regenerating gas, the improvement comprising:

bulkhead means located adjacent said container wall for separating a portion of the adsorbent material adjacent said container wall from the remaining adsorbent material in said container, said bulkhead means being open on one side in the direction of flow of the gases and almost entirely closed on the other side thereof; and secondary feeding means or secondary discharge means associated with the space defined by said bulkhead means for independently respectively feeding regenerating gas to, or discharging regenerating gas from, the portion of adsorbent material in said space defined by said bulkhead means.

9. An adsorber according to claim 8, wherein said bulkhead means comprises a bulkhead (6) connected at the bottom to said container wall (3) and with its top edge extending above the level of the adsorbent material within the container, said bulkhead (6) having a grate near its lower end connected to said bulkhead (6) and to the container wall (3) for supporting the adsorbent thereon.

10. An adsorbent according to claim 8, wherein said bulkhead means comprises a bulkhead (7) connected at the bottom to said container wall (3) by means of a grate (5) with adsorbent supported on said grate (5), and the top edge of said bulkhead extending above the level of the adsorbent within the container.

11. An adsorber according to claim 8, wherein said secondary feeding means or secondary discharge means comprises secondary means for feeding regenerating gas.

12. An adsorber according to claim 8, wherein said secondary feeding means or secondary discharge means comprises secondary means for discharging regenerating gas.

* * * * *

UNITED STATES PATENT AND TRADEMARK OFFICE
CERTIFICATE OF CORRECTION

PATENT NO. : 4,353,716

DATED : October 12, 1982

INVENTOR(S) : WILHELM ROHDE

It is certified that error appears in the above-identified patent and that said Letters Patent is hereby corrected as shown below:

Abstract, line 13: reads "material adjacent the adsorber wall from the remaining"
should read --material in a zone near the adsorber wall from the remaining--

Column 2, lines 63-65: reads "adsorbent present in the zone of the container wall, or the portion present in the adsorbent near the container"
should read --adsorbent present in the zone near the container wall, or the portion present in the adsorbent in the zone near the container--

Column 8, line 53: reads "adjacent said container wall than the defined ratio of the"
should read --in the zone near said container wall than the defined ratio of the--

Column 8, line 59: reads "material adjacent the container wall relative to the"
should read --material in the zone near the container wall relative to the--

UNITED STATES PATENT AND TRADEMARK OFFICE
CERTIFICATE OF CORRECTION

PATENT NO. : 4,353,716

DATED : October 12, 1982

INVENTOR(S) : WILHELM ROHDE

It is certified that error appears in the above-identified patent and that said Letters Patent is hereby corrected as shown below:

Column 8, lines 65-66: reads "regenerating gas to the adsorbent located adjacent to said container wall separately to the feeding of the re-"
should read--regenerating gas to the adsorbent located in the zone near the container wall separately to the feeding of the re- --

Column 9, lines 3-4: reads "of the regenerating gas from the adsorbent located adjacent said container wall separately from the discharging"
should read--of the regenerating gas from the adsorbent located in the zone near the container wall separately from the discharging--

Column 9, line 11: reads "over the adsorbent material adjacent said container wall"
should read--over the adsorbent material in the zone near the container wall--

Column 9, line 29: reads "adjacent said container wall from the remaining"
should read--in a zone near the container wall from the remaining--

Signed and Sealed this

Eleventh Day of January 1983

[SEAL]

Attest:

GERALD J MOSSINGHOFF

Attesting Officer    Commissioner of Patents and Trademarks